United States Patent
Kao

(10) Patent No.: US 9,077,388 B2
(45) Date of Patent: Jul. 7, 2015

(54) SYSTEM FOR NEAR FIELD COMMUNICATION (NFC) AND FREQUENCY MODULATION (FM) COMMUNICATION AND PORTABLE ELECTRONIC DEVICE USING THE SAME

(71) Applicant: Chi Mei Communication Systems, Inc., New Taipei (TW)

(72) Inventor: Yu-Chang Kao, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 100 days.

(21) Appl. No.: 13/938,287

(22) Filed: Jul. 10, 2013

(65) Prior Publication Data

US 2014/0148097 A1    May 29, 2014

(30) Foreign Application Priority Data

Nov. 29, 2012  (TW) ............................. 101144627 A

(51) Int. Cl.
*H04B 5/00* (2006.01)
*H04B 1/04* (2006.01)
*H04B 1/18* (2006.01)
*H04B 1/00* (2006.01)

(52) U.S. Cl.
CPC ........ *H04B 5/00* (2013.01); *H04B 1/006* (2013.01); *H04B 1/0458* (2013.01); *H04B 1/18* (2013.01)

(58) Field of Classification Search
USPC .................................................. 455/41.1, 41.2
See application file for complete search history.

(56) References Cited

U.S. PATENT DOCUMENTS 8,682,261 B2 *   3/2014   Ozaki et al. ...................... 455/82
8,725,088 B2 *   5/2014   Ginsburg et al. ............... 455/83

\* cited by examiner

*Primary Examiner* — Tuan H Nguyen
(74) *Attorney, Agent, or Firm* — Novak Druce Connolly Bove + Quigg LLP

(57) ABSTRACT

A system for near field communication (NFC) and frequency modulation (FM) communication includes a NFC microchip, a FM microchip, a control microchip, a switch module. The switch module switches between the NFC matching module and the FM matching module under control of the control microchip. A NFC matching module electronically connected to the antenna modulates working frequency of the NFC microchip to match with an antenna. A FM matching module electronically connected to the antenna modulates working frequency of the FM microchip to match with the antenna.

14 Claims, 2 Drawing Sheets

SYSTEM FOR NEAR FIELD COMMUNICATION (NFC) AND FREQUENCY MODULATION (FM) COMMUNICATION AND PORTABLE ELECTRONIC DEVICE USING THE SAME

BACKGROUND

1. Technical Field

The present disclosure relates to systems for near field communication (NFC) and frequency modulation (FM) communication, and more particularly to a system for sharing a single antenna for NFC and FM communication used in a portable electronic device.

2. Description of Related Art

Most portable electronic devices have different functions, such as a frequency modulation (FM) communication function, and a near field communication (NFC) function. Due to difference in frequencies at which NFC and FM communication operates, each requires an individual antenna. It is uncommon for devices to include antennas for both NFC and FM communications, because space inside the devices is generally limited.

Therefore, there is room for improvement within the art.

BRIEF DESCRIPTION OF THE DRAWINGS

Many aspects of the present system for NFC and FM communication and portable electronic device can be better understood with reference to the following drawings. The components in the various drawings are not necessarily drawn to scale, the emphasis instead being placed upon clearly illustrating the principles of the present system for NFC and FM communication and the portable electronic device.

DETAILED DESCRIPTION

Figure 1:
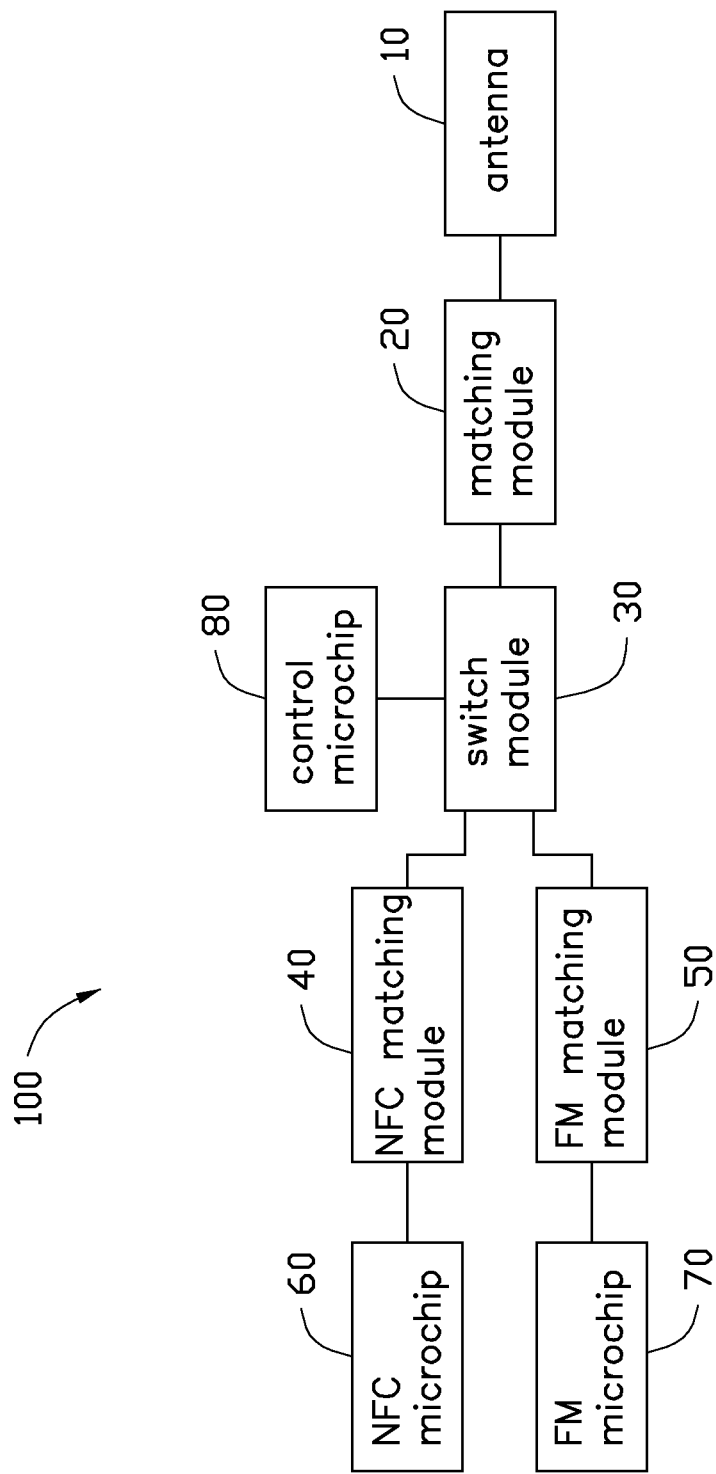
FIG. 1 is a block diagram of a system for NFC and FM communication according to an exemplary embodiment of the present disclosure.

FIG. 1 is a block diagram of a system 100 for near field communication (NFC) and frequency modulation (FM) communication according to an exemplary embodiment of the present disclosure. The system 100 can be used in a portable electronic device, such as a mobile phone, a personal digital assistance or a computer, for example. The system 100 includes an antenna 10, a matching module 20, a switch module 30, a NFC matching module 40, a FM matching module 50, a NFC microchip 60, a FM microchip 70, and a control microchip 80. The antenna 10 is located in the portable electronic device. The matching module 20 is electronically connected to the antenna 10, and allows the antenna 10 to be operated in several frequency bands. The switch module 30 is electronically connected to the matching module 20, the NFC matching module 40, and the FM matching module 50. The NFC matching module 40 is electronically connected to the NFC microchip 60, and the FM matching module 50 is electronically connected to the FM microchip 70.

The switch module 30 switches between the NFC matching module 40 and the FM matching module 50 under control of the control microchip 80. The switch module 30 can be a diplexer or a single-pole double-throw switch; in the embodiment, the switch module 30 is a diplexer. In the embodiment, the control microchip 80 is a central processing unit of the portable electronic device.

Figure 2:
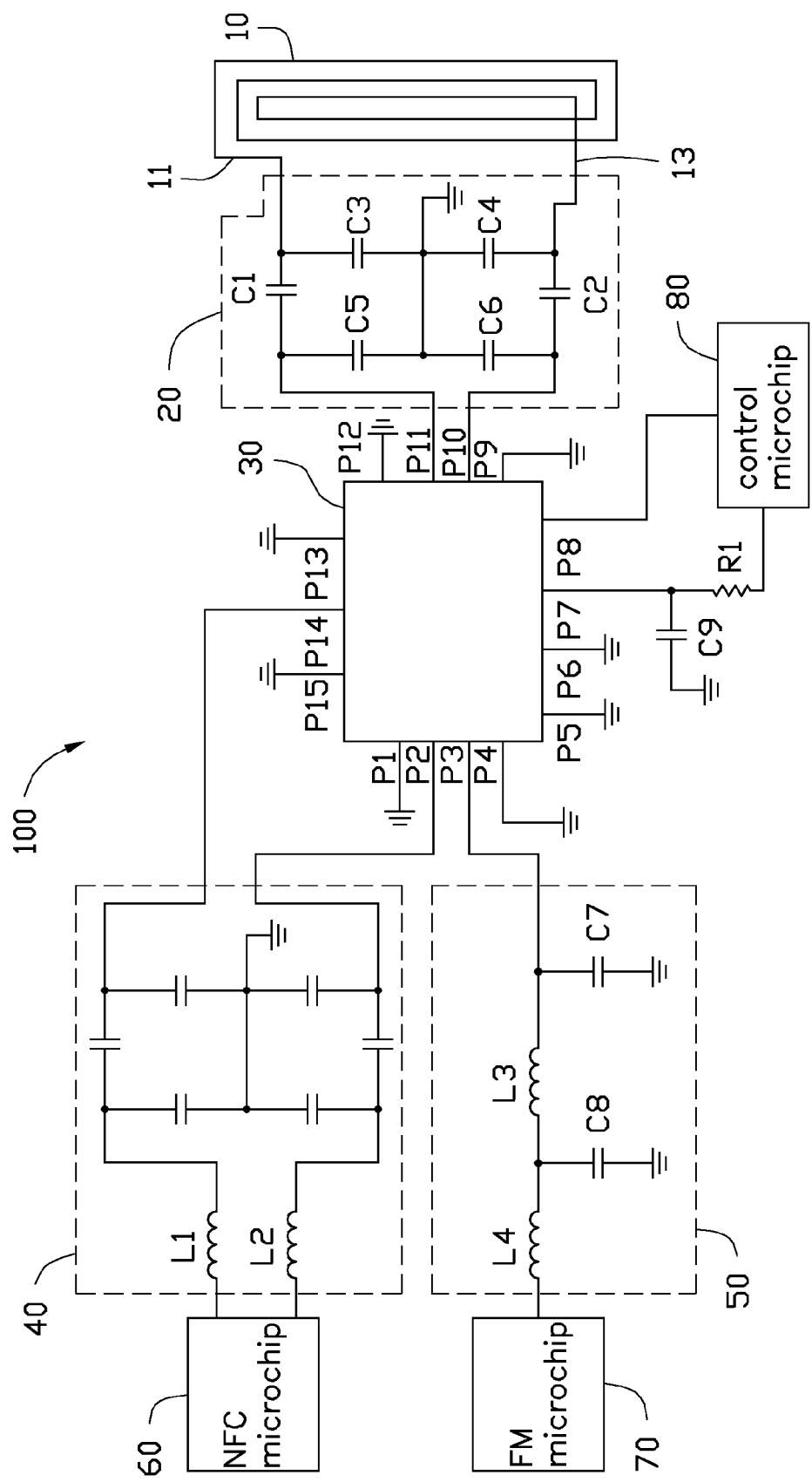
FIG. 2 is a circuit diagram of the system shown in FIG. 1.

FIG. 2 shows a circuit diagram of the system 100. The antenna 10 has a first feed terminal 11 and a second feed terminal 13 both electronically connected to the matching module 20. The matching module 20 includes a first capacitor C1, a second capacitor C2, a third capacitor C3, a fourth capacitor C4, a fifth capacitor C5, and a sixth capacitor C6. The first feed terminal 11 is grounded by the third capacitor C3, and the second feed terminal 13 is grounded by the fourth capacitor C4. The first capacitor C1 and the fifth capacitor C5 are electronically connected in series between the first feed terminal 11 and the ground. The second capacitor C2 and the sixth capacitor C6 are electronically connected in series between the second feed terminal 13 and the ground. The first capacitor C1 is electronically connected the first feed terminal 11, and the second capacitor C2 is electronically connected the second feed terminal 13.

The switch module 30 includes fifteen pins P1-P15. A seventh pin P7 and an eighth pin P8 are electronically connected to the control microchip 80. The control microchip 80 supplies power to the switch module 30 though the seventh pin P7, and sends control signals to the switch module 30 by the eighth pin P8. A tenth pin P10 is electronically connected to the second capacitor C2 and the sixth capacitor C6, and an eleventh pin P11 is electronically connected to the first capacitor C1 and the fifth capacitor C5. A second pin P2 and a fourteenth pin P14 are both electronically connected to the NFC matching module 40. A third pin P3 is electronically connected to the FM matching module 50. Other pins P1, P4-P6, P9, P12, P13 and P15 are grounded.

The NFC matching module 40 is similar with the matching module 20, and further includes a first inductor L1 and a second inductor L2. The first inductor L1 and the second inductor L2 are electronically connected between the NFC microchip 60 and capacitors of the NFC matching module 40 respectively. When the NFC matching module 40 is electronically connected to the antenna 10, the NFC matching module 40 modulates working frequency of the NFC microchip 60 to match with the antenna 10, and the near field communication operates at 13.56 MHz, in one example.

The FM matching module 50 includes a third inductor L3, a fourth inductor L4, a seventh capacitor C7, and an eighth capacitor C8. The third inductor L3 and the fourth inductor L4 are electronically connected in series between the FM microchip 70 and the third pin P3 of the switch module 30. The third inductor L3 is electronically connected to the third pin P3, and the fourth inductor L4 is electronically connected to the FM microchip 70. The eighth capacitor C8 is electronically connected between the fourth inductor L4 and the ground. The seventh capacitor C7 is electronically connected between the third inductor L3 and the ground and is electronically connected to the third pin P3. When the FM matching module 50 is electronically connected to the antenna 10, the FM matching module 50 modulates working frequency of the FM microchip 70 to match with the antenna 10, and the frequency modulation communication operates at 88 MHz-108 MHz.

The control microchip 80 is electronically connected to the seventh pin P7 of the switch module 30 by a resistor R1. The resistor R1 is grounded by a ninth capacitor C9.

When the control microchip 80 provides a low level voltage (i.e., logic 0) to the eighth pin P8, the eleventh pin P11 is electronically connected to the fourteenth pin P14, and the tenth pin P10 is electronically connected to the second pin P2. The antenna 10 is electronically connected to the NFC matching module 40 by the switch module 30. The NFC matching module 40 modulates working frequency of the NFC microchip 60 to match with the antenna 10, and the near field communication starts to operate.

When the control microchip 80 provides a high level voltage (i.e., logic 1) to the eighth pin P8, the eleventh pin P11 is electronically connected to the third pin P3, and the tenth pin P10 is electronically connected to the fifth pin P5 to be grounded. The antenna 10 is electronically connected to the FM matching module 50 by the switch module 30. The FM matching module 50 modulates working frequency of the NFC microchip 60 to match with the antenna 10, and the frequency modulation communication starts to operate.

The switch module 30 switches between the NFC matching module 40 and the FM matching module 50 under the control of the control microchip 80, and then the antenna 10 can be electronically connected to the NFC microchip 60 or the FM microchip 70. The NFC matching module 40 modulates working frequency of the NFC microchip 60, and the FM matching module 50 modulates working frequency of the FM microchip 70, the system communication quality is improved.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A system for near field communication (NFC) and frequency modulation (FM) communication used in a portable electronic device, the system comprising:
   an antenna;
   a matching module electronically connected to the antenna and to allow the antenna to operate in several frequency bands;
   a NFC microchip;
   a FM microchip;
   a control microchip;
   a switch module electronically connected to the matching module and the control microchip;
   a NFC matching module electronically connected between the switch module and the NFC microchip; and
   a FM matching module electronically connected between the switch module and the FM microchip;
   wherein the switch module switches between the NFC matching module and the FM matching module under control of the control microchip; when the NFC matching module is electronically connected to the antenna by the switch module and the matching module, the NFC matching module modulates working frequency of the NFC microchip to match with the antenna to realize near field communication; when the FM matching module is electronically connected to the antenna by the switch module and the matching module, the FM matching module modulates working frequency of the FM microchip to match with the antenna to realize frequency modulation communication;
   wherein the switch module comprises fifteen pins, a seventh pin and an eighth pin of the switch module are electronically connected to the control microchip, the control microchip supplies power to the switch module though the seventh pin, and sends control signals to the switch module by the eighth pin; a tenth pin and eleventh pin of the switch module are electronically connected to the matching module; a second pin and a fourteenth pin are electronically connected to the NFC matching module; a third pin is electronically connected to the FM matching module; other pins of the switch module are grounded.

2. The system as claimed in claim 1, wherein the switch module is a diplexer or a single-pole double-throw switch.

3. The system as claimed in claim 1, wherein a first feed terminal of the antenna and a second feed terminal of the antenna are electronically connected to the matching module.

4. The system as claimed in claim 3, wherein the matching module comprises a first capacitor electronically connected the first feed terminal, a second capacitor electronically connected the second feed terminal, a third capacitor, a fourth capacitor, a fifth capacitor, and a sixth capacitor; the first feed terminal is grounded by the third capacitor, and the second feed terminal is grounded by the fourth capacitor; the first capacitor and the fifth capacitor are electronically connected in series between the first feed terminal and the ground; the second capacitor and the sixth capacitor are electronically connected in series between the second feed terminal and the ground.

5. The system as claimed in claim 4, wherein the NFC matching module is similar with the matching module, and further comprises a first inductor and a second inductor; the first inductor and the second inductor are electronically connected between the NFC microchip and capacitors of the NFC matching module.

6. The system as claimed in claim 5, wherein the FM matching module comprises a third inductor, a fourth inductor, a seventh capacitor, and a eighth capacitor; the third inductor and the fourth inductor are electronically connected in series between the FM microchip and the switch module, the eighth capacitor is electronically connected between the fourth inductor and the ground, the seventh capacitor is electronically connected between the third inductor and the ground and is electronically connected to the switch module.

7. The system as claimed in claim 1, wherein the control microchip is electronically connected to the seventh pin of the switch module by a resistor, the resistor is grounded by a ninth capacitor.

8. A portable electronic device for near field communication (NFC) and frequency modulation (FM) communication, the portable electronic device comprising:
   an antenna;
   a matching module electronically connected to the antenna and to allow the antenna to operate in several frequency bands;
   a control microchip;
   a switch module electronically connected to the matching module and the control microchip;
   a NFC matching module electronically connected between the switch module and a NFC microchip of the portable electronic device; and
   a FM matching module electronically connected between the switch module and a FM microchip of the portable electronic device;
   wherein the switch module switches between the NFC matching module and the FM matching module under control of the control microchip; when the NFC matching module is electronically connected to the antenna by the switch module and the matching module, the NFC matching module modulates working frequency of the NFC microchip to match with the antenna to realize near field communication; when the FM matching module is electronically connected to the antenna by the switch module and the matching module, the FM matching module modulates working frequency of the FM microchip to match with the antenna to realize frequency modulation communication;

wherein the switch module comprises fifteen pins, a seventh pin and an eighth pin of the switch module are electronically connected to the control microchip, the control microchip supplies power to the switch module though the seventh pin, and sends control signals to the switch module by the eighth pin; a tenth pin and eleventh pin of the switch module are electronically connected to the matching module; a second pin and a fourteenth pin are electronically connected to the NFC matching module; a third pin is electronically connected to the FM matching module; other pins of the switch module are grounded.

9. The portable electronic device as claimed in claim 8, wherein the switch module is a diplexer or a single-pole double-throw switch.

10. The portable electronic device as claimed in claim 8, wherein a first feed terminal of the antenna and a second feed terminal of the antenna are electronically connected to the matching module.

11. The portable electronic device as claimed in claim 10, wherein the matching module comprises a first capacitor electronically connected the first feed terminal, a second capacitor electronically connected the second feed terminal, a third capacitor, a fourth capacitor, a fifth capacitor, and a sixth capacitor; the first feed terminal is grounded by the third capacitor, and the second feed terminal is grounded by the fourth capacitor; the first capacitor and the fifth capacitor are electronically connected in series between the first feed terminal and the ground; the second capacitor and the sixth capacitor are electronically connected in series between the second feed terminal and the ground.

12. The portable electronic device as claimed in claim 11, wherein the NFC matching module is similar with the matching module, and further comprises a first inductor and a second inductor; the first inductor and the second inductor are electronically connected between the NFC microchip and capacitors of the NFC matching module.

13. The portable electronic device as claimed in claim 12, wherein the FM matching module comprises a third inductor, a fourth inductor, a seventh capacitor, and a eighth capacitor; the third inductor and the fourth inductor are electronically connected in series between the FM microchip and the switch module, the eighth capacitor is electronically connected between the fourth inductor and the ground, the seventh capacitor is electronically connected between the third inductor and the ground and is electronically connected to the switch module.

14. The portable electronic device as claimed in claim 8, wherein the control microchip is electronically connected to the seventh pin of the switch module by a resistor, the resistor is grounded by a ninth capacitor.

* * * * *